Jan. 11, 1944.  C. A. WEST ET AL  2,338,696
TIRE LOOSENING DEVICE
Filed June 16, 1941
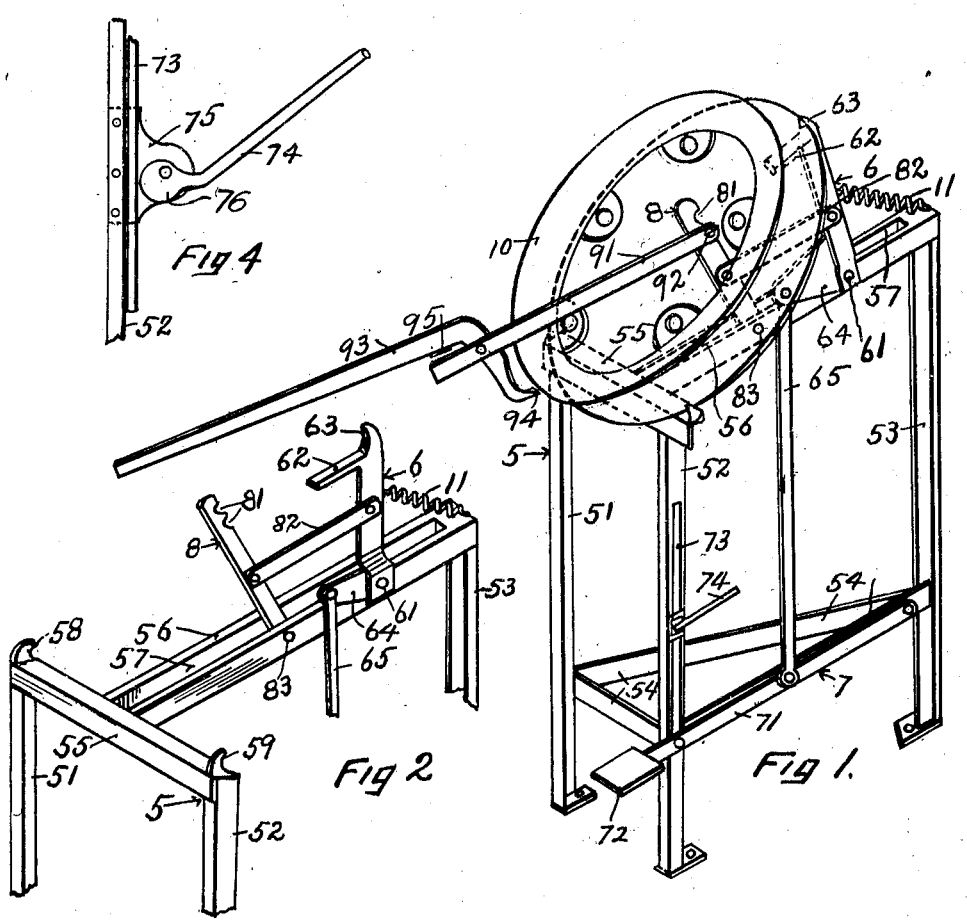
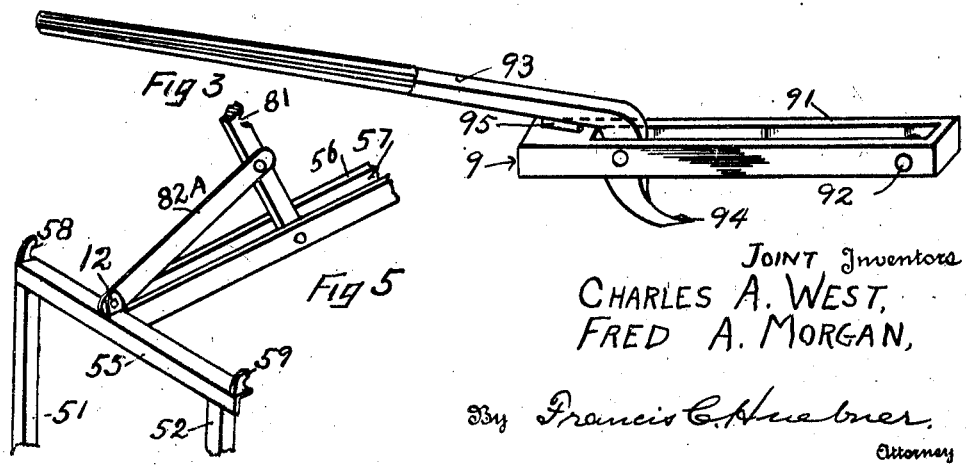
JOINT Inventors
CHARLES A. WEST,
FRED A. MORGAN,
By Francis C. Huebner.
Attorney Patented Jan. 11, 1944

2,338,696

UNITED STATES PATENT OFFICE 2,338,696

TIRE LOOSENING DEVICE

Charles A. West and Fred A. Morgan, Selma, Calif.

Application June 16, 1941, Serial No. 398,290

2 Claims. (Cl. 144—288.1)

Our invention relates to a device for holding wheels equipped with pneumatic tires and for loosening the tire on the rim. The object of the invention being to hold the wheel firmly so that the tire can be easily loosened, removed, and replaced. Other objects accomplished is the adjustability of the device to hold wheels of varying diameters, a fulcrum which positions itself automatically in the center of the wheel, and a lever which can be easily attached to said fulcrum so pressure can be had on the tire to loosen it from the rim, and which cannot easily get out of order. Other objects will be suggested hereinafter in this specification.

These objects are accomplished by means of the device hereinafter described, and illustrated on the accompanying drawing, in which Fig. 1 is a perspective view of the device with the rim of a wheel positioned thereon.

Fig. 2 shows the clamping members of the device from the same general view shown in Fig. 1, said figure being slightly enlarged, and having parts thereof cut away.

Fig. 3 is a perspective view of the lever used in conjunction with the vise for removing the tire.

Fig. 4 is a side view of an automatic locking device.

Fig. 5 is a modified form of frame in which the automatic adjusting feature of the fulcrum is dispensed with, and the fulcrum is held in a fixed position.

Referring to the drawing, the legs holding the vise are represented by elements 51, 52 and 53. Near the bottom of said legs are ties 54 in the form of a triangle, and attached to the legs, the purpose of said ties being to strengthen the entire frame 5. A supporting beam 55 connects legs 51 and 52 at the top, and at either end of said beam 55 are hooks 58 and 59. An auxiliary support 56 is connected at the approximately lateral center of supporting beam 55, and to the rear leg 53. I have shown auxiliary support 56 with a channel 57 therein, but said channel is not a necessary feature of the invention.

To auxiliary support 56 is pivotally connected clamping jaw 6. Clamping jaw 6 is constructed with a lip 62, and a hook 63 which cooperate with hooks 58 and 59 in retaining the rim of the wheel. Clamping jaw 6 is pivotally connected to auxiliary support 56 with pivot 61. Jaw 6 also is provided with a lever 64 which is connected to a pedal lever 71, being a part of the pedal assembly 7, with a connecting rod or strap 65. By pressing downward on pedal 72, shown in Fig. 1, it will be noted that clamping jaw 6 will be moved forward, and thus shorten the distance between hooks 58 and 59, with hook 63. By placing rim 10 in the vise so that the lower edge of the rim approximately engages hooks 58 and 59, and rests also on lip 62, and then by pressing downward on pedal 72 the rim 10 will be clamped between hooks 58, 59 and 63. In order to hold the rim of the wheel in said clamped position, I have formed an automatic lock consisting of a metal strap 73, shown in Figs. 1 and 4, which strap is pivotally attached to pedal lever 71. This strap is pulled through a slideway indicated as 75. Slideway 75 supports an eccentric member 76 which bears against strap 73 by reason of the weight of handle 74, and thus by the pressure of eccentric member 72 against strap 73 within the slideway, will lock it with said slideway 75, against leg 52, to which the slidaway is attached. When it is desired to release said lock all that is necessary is to raise lever 74.

The fulcrum is represented as 8, and consists of a post pivotally attached at one end to auxiliary support 56 by a pivot 83. At the upper end post 8 has notches 81 the use of which will be hereinafter explained. A strap 82 pivotally connects clamping jaw 6 with fulcrum 8 so that fulcrum 8 moves simultaneously with the clamping jaw, the object being to move the fulcrum toward the center of the rim of the wheel when assembled with the vise. An expansion spring 11 connects clamping jaw 6 with the rear of auxiliary support 56, the object of said spring being to normally hold the clamping hooks apart so the rim of the wheel can be easily assembled with the vise.

The lever, or tool 9 for removing the tire when the wheel is being held in the device is shown assembled with the vise in Fig. 1, and is shown separately in Fig. 3. It consists of a slotted member 91, having a pin, or catch 92 which is adapted to cooperate with notches 81 in fulcrum 8, to hold tool 9 to the fulcrum. To slotted member 91 is pivotally attached a lever 93, having a stop 95 to limit the downward movement of lever 93 with relation to slotted member 91, and also having a pointed portion 94 which is adapted to be forced between the rim and the bead of the tire. The length of slotted member 91 should be such that the pivotal point of lever 93 with slotted member 91 should be slightly beyond the outside rim of the wheel, so that by pressing lever 93 downward, wedge point 94 can enter between the rim and the tire, and then, by pressing further downward, the tire is loosened from the rim, and can be then removed.

In Fig. 5 we have shown a modified form in which the fulcrum is in a fixed position, the strap 82 being removed, and a strap 82A being substituted and anchored to the frame at 12.

Having described our invention we claim as new and ask for Letters Patent:

1. A device for loosening the tire from the rim of a wheel with a vise adapted to hold said wheel, said vise comprising a frame, a stationary jaw mounted on said frame and adapted to engage one side of the rim, an upwardly projecting arm, means pivoting the lower end of said arm to said frame, a jaw mounted on the upper end of said arm and adapted to engage the opposite side of a rim, said jaw constituting a vise for gripping a rim, an upward projecting fulcrum support, means pivoting the lower end of said support to said frame, a strap pivotally connected at one end to the moving jaw, and at the other end to the fulcrum support, whereby said fulcrum is adapted to move synchronously with the movements of the moving jaw, a lever having a double curve at one end, said double curve ending in a tire loosening wedge, a rigid connection pivotally attached at one end to said lever and at the opposite end to the fulcrum support, said connection transmitting the operating force to said lever to said moveable jaw for clamping the rim simultaneously with the engagement of the wedge with the tire in the rim, stop means on said connection limiting the movement of the lever, said stop means adapting the lever and the connection to become in rigid relation with each other, and to transfer the fulcrum of said lever to the opposite end of said connection.

2. A device for loosening the tire from the rim of a wheel, with a vise comprising a frame, a stationary jaw mounted on said frame, and adapted to engage one side of a rim, an upwardly projecting fulcrum support, means pivoting the lower end of said fulcrum support to said frame, a jaw mounted on the upper end of said support and adapted to engage the opposite side of the rim, said jaws constituting a vise for gripping a rim, a lever formed as a wedge at one end thereof, a rigid strap pivotally connected with the lever and with the fulcrum support, said strap transmitting the operating force of said lever to said moveable jaw for clamping the rim simultaneously with the engagement of the wedge with the tire on the rim, stop means on said rigid strap limiting the movement of the lever with relation to said strap, and adapting the lever and the strap to be combined as a longer lever having the fulcrum at the end of the strap adjacent to the fulcrum support.

CHAS. A. WEST.
FRED A. MORGAN.